(12) United States Patent
Lin (10) Patent No.: US 7,062,525 B1
(45) Date of Patent: Jun. 13, 2006

(54) CIRCUIT AND METHOD FOR NORMALIZING AND ROUNDING FLOATING-POINT RESULTS AND PROCESSOR INCORPORATING THE CIRCUIT OR THE METHOD

(75) Inventor: David H. Lin, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 681 days.

(21) Appl. No.: 10/232,001

(22) Filed: Aug. 30, 2002

(51) Int. Cl.
*G06F 5/01* (2006.01)

(52) U.S. Cl. ..................................................... 708/497

(58) Field of Classification Search ........ 708/496–499, 708/205
See application file for complete search history.

(56) References Cited

U.S. PATENT DOCUMENTS

| 5,487,022 A | * | 1/1996 | Simpson et al. ............ 708/205 |
| 5,508,948 A | | 4/1996 | Hatta |
| 5,568,412 A | | 10/1996 | Han et al. |
| 5,761,103 A | * | 6/1998 | Oakland et al. ............ 708/497 |
| 6,085,208 A | * | 7/2000 | Oberman et al. ........... 708/205 |
| 6,148,314 A | * | 11/2000 | Matheny et al. ............ 708/497 |
| 6,415,308 B1 | | 7/2002 | Dhablania |
| 6,785,701 B1 | | 8/2004 | Park et al. |

* cited by examiner

Primary Examiner—D. H. Malzahn
(74) Attorney, Agent, or Firm—Hitt Gaines, PC (57) ABSTRACT

For use in a floating-point unit that supports floating-point formats having fractional parts of varying widths and employs a datapath wider than the fractional parts, a circuit and method for normalizing and rounding floating-point results and processor incorporating the circuit or the method. In one embodiment, the circuit includes: (1) left-shift circuitry for aligning a fractional part of the floating-point result with a most significant bit of the datapath and irrespective of a width of the fractional part to yield a shifted fractional part and (2) rounding circuitry, coupled to the shift circuitry, that rounds the shifted fractional part.

20 Claims, 9 Drawing Sheets

OPERAND A

| 63 | 24 23 | 0 |
|---|---|---|
| | FRACTION | |

OPERAND B

| 63 | 24 23 | 0 | |
|---|---|---|---|
| | FRACTION | | GRS |

RESULT WITH OVERFLOW

| 63 | 25 24 23 | 0 | |
|---|---|---|---|
| | O | FRACTION | GRS |

RESULT WITH LEADING ZEROS

| 63 | 24 23 | 0 | |
|---|---|---|---|
| | 0\|0\|0\|0\| FRACTION | | GRS |

FIGURE 1A

LEFT-ALIGNED RESULT

| 63 | 40 | 0 |
|---|---|---|
| FRACTION | GR | S |

FIGURE 1B

RESULT AFTER ROUNDING

| 63 | 40 | 0 |
|---|---|---|
| O | FRACTION | |

FIGURE 1C

OPERAND A

| 63 | 53 52 | | 0 |
|---|---|---|---|
| | | FRACTION | |

OPERAND B

| 63 | 53 52 | | 0 | |
|---|---|---|---|---|
| | | FRACTION | | GRS |

RESULT WITH OVERFLOW

| 63 | 53 52 | | 0 | |
|---|---|---|---|---|
| | O | FRACTION | | GRS |

RESULT WITH LEADING ZEROS

| 63 | 53 52 | | | | | 0 | |
|---|---|---|---|---|---|---|---|
| | | 0 | 0 | 0 | FRACTION | | GRS |

FIGURE 1D

LEFT-ALIGNED RESULT

| 63 | | 11 | | 0 |
|---|---|---|---|---|
| | FRACTION | | GR | S |

FIGURE 1E

RESULT AFTER ROUNDING

| | 63 | | 11 | 0 |
|---|---|---|---|---|
| O | | FRACTION | | |

FIGURE 1F

OPERAND

| 63 | 24 23 | 0 |
|---|---|---|
| | FRACTION | |

LEFT-ALIGNED RESULT

| 63 | 40 | 11 | 0 |
|---|---|---|---|
| FRACTION | 0 0 0 ... | | |

FIGURE 1G

OPERAND

| 63 | 53 52 | 0 |
|---|---|---|
| | FRACTION | |

LEFT-ALIGNED RESULT

| 63 | 40 | | 11 | 0 |
|---|---|---|---|---|
| FRACTION | GR | STICKY | | |

FIGURE 1H

RESULT AFTER ROUNDING

| 63 | 40 | 0 |
|---|---|---|
| O | FRACTION | |

FIGURE 1I

OPERAND

| 63 | 32 31 | 0 |
|---|---|---|
| | 0 0 0 | INTEGER |

LEFT-ALIGNED RESULT

| 63 | 40 | 32 | 0 |
|---|---|---|---|
| FRACTION | GR | STICKY | |

FIGURE 1J

RESULT AFTER ROUNDING

| 63 | 40 | 0 |
|---|---|---|
| O | FRACTION | |

FIGURE 1K

OPERAND

| 63 | 0 |
|---|---|
| 0 0 0 0 | INTEGER |

LEFT-ALIGNED RESULT

| 63 | 40 | 0 |
|---|---|---|
| FRACTION | GR | STICKY |

FIGURE 1L

RESULT AFTER ROUNDING

| 63 | 40 | 0 |
|---|---|---|
| O | FRACTION | |

FIGURE 1M

OPERAND

| 63 | 32 31 | | | | 0 |
|---|---|---|---|---|---|
| | 0 | 0 | 0 | 0 | INTEGER |

LEFT-ALIGNED RESULT

| 63 | 32 | 11 | 0 |
|---|---|---|---|
| FRACTION | 0 0 0 ... | | |

FIGURE 1N

OPERAND

| 63 | | | | 0 |
|---|---|---|---|---|
| 0 | 0 | 0 | 0 | INTEGER |

LEFT-ALIGNED RESULT

| 63 | 11 | | 0 |
|---|---|---|---|
| FRACTION | | GR | STICKY |

FIGURE 1P

RESULT AFTER ROUNDING

| 63 | | 11 | 0 |
|---|---|---|---|
| O | FRACTION | | |

CIRCUIT AND METHOD FOR NORMALIZING AND ROUNDING FLOATING-POINT RESULTS AND PROCESSOR INCORPORATING THE CIRCUIT OR THE METHOD

TECHNICAL FIELD OF THE INVENTION

The present invention is directed, in general, to floating-point computing systems and, more specifically, to a circuit and method for normalizing and rounding floating-point results and a processor incorporating the circuit or the method.

BACKGROUND OF THE INVENTION

Floating-point formats are typically defined such that the fraction portion of the number has an assumed 1 (one) to the left of the fractional part (assuming little-endian orientation). Because of this "hidden 1" of the fractional part, the number is able to hold the greatest number of significant bits, thus improving the accuracy of floating-point arithmetic and conversion operations. To maintain the proper normalized value for the fractional part, it is necessary to normalize the results after mathematical operations.

For example, when the number 1.01 is subtracted from 1.011, the resulting 0.001 should be normalized to 1.000, and the exponent part of the number should be adjusted accordingly (decreased by 3). Thus, the normalizing of the fractional part of the number is needed for operations where the leading 0s (zeros) are removed. Normalizing the fractional part is also needed for overflow conditions. For example, when 1.0 is added to 1.0, the result is 2.0. The result should be normalized such that the fractional part is 1.0 (i.e., 0, without the "hidden 1"), and the exponent part should be adjusted accordingly (increased by 1).

Moreover, rounding may be necessary when the precision of a floating-point result is greater than can be represented with the floating-point format. For example, when two numbers are multiplied, the result has twice as many bits of precision as the operands. In such situations, the resulting number may need to be approximated to be represented in the floating-point format. The bits that cannot be represented are used to determine the direction that the number should be rounded (up or down). Floating-to-fixed conversions may also require rounding because only the integer portion of the floating-point operand can be represented in the fixed-point result. The bits that cannot be represented are used to determine the direction that the number should be rounded (up or down).

In performing floating-point arithmetic and conversion operations, additional bits beyond the resulting fractional part must be maintained for rounding purposes. These bits, conventionally called the "guard," "round" and "sticky" bits, arise from increased precision during the above-described operations, as well as from the addition or subtraction of numbers whose exponent parts are different. For example, if a single-precision floating-point number with an exponent part of 25 is added to a single-precision floating-point number with an exponent part of 0 (zero), the fractional part of the second number must be shifted right with respect to the fractional part of the first number to align the decimal points of the two numbers. However, since single-precision floating-point numbers have only 24 bits of precision, 0 (zero) is added to the fractional part of the first number, and the fractional part of the second number is only used for rounding purposes.

The numerical results of arithmetic operations or format conversions undertaken in a floating-point unit (FPU) often require both normalizing and rounding in order to format the floating-point result in properly (i.e., left justified and with the assumption of a "hidden one") and to eliminate any spurious or excessive accuracy that may be contained in the results. Typically, the normalization and rounding of the floating-point results require shifting the results either to the left or right, and may require multiple shift operations. Because of the need to shift the results left or right, and because of the need for multiple shift operations, the normalization and rounding of floating-point results may limit the overall frequency of the FPU, or require that one or more additional stages be added to the FPU (i.e., increase the number of clock cycles required for execution). This represents a disadvantage in overall processor performance. Pursuant to the goal of increased processor performance (e.g., speed), it is desirable to decrease the number of logic levels within a given processor stage, and decrease the number of cycles required for execution of each operation.

As processor speeds increase, it is important to minimize the number of logic levels within each stage of the processor. By reducing the number of logic levels, the processor cycle time can be decreased, and lead to higher processor performance. The normalizing and rounding of floating-point unit results affect almost all floating-point arithmetic and conversion instructions. By optimizing these operations, the performance of the floating-point unit can be increased. Accordingly, what is needed in the art is a device and method for decreasing the amount of time (i.e., decreasing the number of logic levels) needed to perform these important floating-point processing steps.

SUMMARY OF THE INVENTION

To address the above-discussed deficiencies of the prior art, the present invention provides, for use in a floating-point unit that supports floating-point formats having fractional parts of varying widths and employs a datapath wider than the fractional parts, a circuit and method for normalizing and rounding floating-point results and a processor incorporating the circuit or the method. In one embodiment, the circuit includes: (1) left-shift circuitry for aligning a fractional part of the floating-point result with a most significant bit of the datapath irrespective of a width of the fractional part to yield a shifted fractional part and (2) rounding circuitry, coupled to the shift circuitry, that rounds the shifted fractional part.

The present invention therefore introduces a way of managing the rounding of multiple floating-point formats such that the same logical and mathematical operations can be undertaken regardless of the particular format encountered.

In one embodiment of the present invention, a most significant one in the fractional part is aligned with the most significant bit of the datapath, and the exponent is adjusted accordingly. Aligning the most significant one advantageously allows for multiple data formats and multiple cases of arithmetic results to be handled in the same manner, thus reducing the complexity of the normalization logic.

In one embodiment of the present invention, the varying widths are selected from the group consisting of: 23 bits and 52 bits. Of course, those skilled in the pertinent art will understand that other formats may be supported in a given application.

In one embodiment of the present invention, the width of the datapath is 64 bits. Of course, those skilled in the pertinent art will understand that other databus widths are within the scope of the present invention.

In one embodiment of the present invention, the rounding circuitry further generates guard, round and sticky bits for the shifted fractional part. Those skilled in the pertinent art understand the purpose behind, and conventional techniques for generating, guard, round and sticky bits. In a more specific embodiment, the left-shift circuitry shifts the guard and round bits with the fractional part. In an embodiment to be illustrated and described, the sticky bit remains unshifted.

In one embodiment of the present invention, the rounding circuitry further adjusts an exponent part of the floating-point result based upon an overflow from a rounding of the shifted fractional part. As described above, aligning the most significant one advantageously allows any exponent adjustment that may become necessary to be undertaken without requiring further shifting.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

The typical implementation of normalizing and rounding floating-point results includes adjusting the data after each step in a floating-point operation so that the decimal point is maintained in the same or otherwise appropriate position. The present invention provides a circuit and method for simplifying the normalizing and rounding. A processor incorporating the circuit or the method is also disclosed and falls within the scope of the present invention. This description begins with the concepts of the present invention, and subsequently sets forth several exemplary embodiments through which these concepts may be realized.

Instead of trying to keep the decimal position of single-precision and double-precision format data in the "correct" position for a given format (i.e., between bits 22 and 23 for single-precision format, and between bits 52 and 53 for double-precision format), the data is consistently aligned to a most significant bit irrespective of format. An embodiment to be illustrated and described employs a datapath 64 bits in width; therefore, the most significant bit is bit 63 in the particular datapath. By doing so, data shifting steps can be combined and/or altogether avoided.

Single-Precision Arithmetic Operations

Figure 1A:
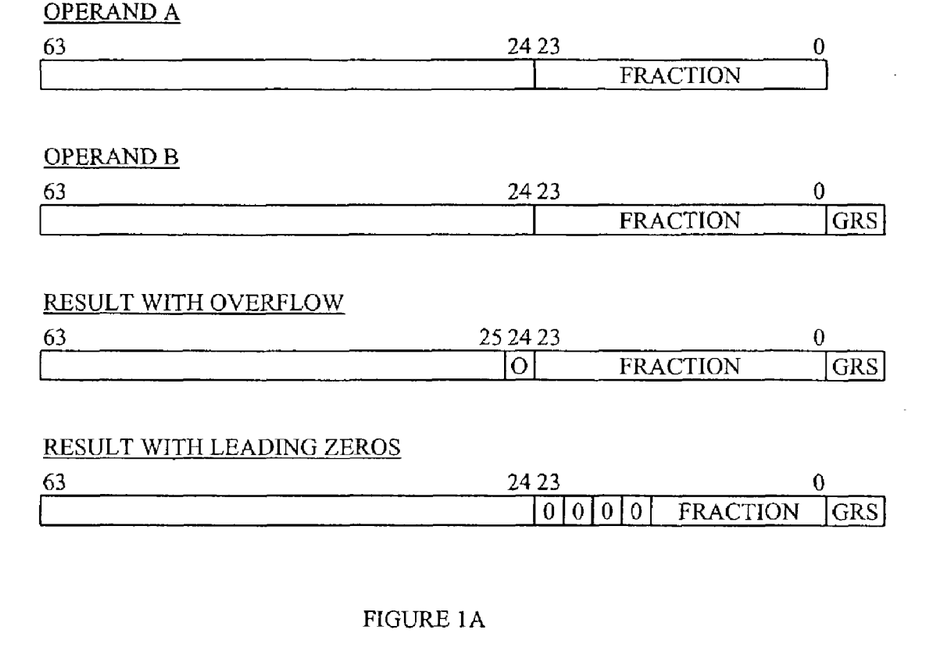
FIGS. 1A–1N, 1P and 1Q illustrate embodiments of datapaths according to the present invention.

Single-precision floating-point numbers have 24 bits of precision, once the "hidden 1" is included in the number. For single-precision arithmetic operations, the operands and results within the 64-bit datapath are shown in FIG. 1A.

Figure 1B:
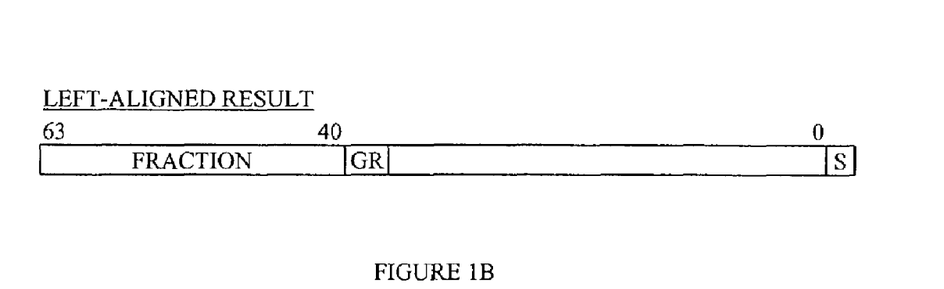

In the "Result with overflow," the "O" bit represents an overflow from the math operation, such as may occur with addition. In the "Result with leading zeros," the fractional part includes several leading zeros resulting from the math operation, such as may occur with subtraction, where the most significant bits are canceled out. In both cases, instead of shifting the data right for overflow, or shifting the data left for leading zeros, the leftmost 1 (one) of the result is determined and the result is shifted so that the leftmost 1 (one) is at bit position 63. The exponent part is updated accordingly. The resulting data is shown in FIG. 1B.

Figure 1C:
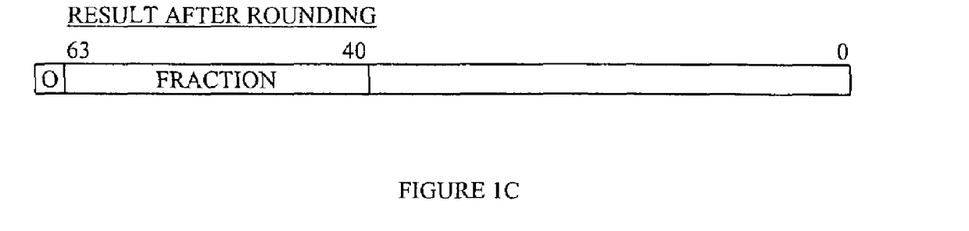

Note that the sticky bit, which represents any number of bits that are shifted right beyond the round bit, does not shift. The result is now ready to be rounded based on the guard, round and sticky bits, as well as the rounding mode configuration setting. The result after rounding is shown in FIG. 1C.

The guard, round and sticky bits are no longer necessary. However, it is possible that the rounding of the result will cause an overflow out of the most significant bit, as indicated by the "O" bit to the left of bit position 63 above. It can be noted that the only time that rounding would cause such an overflow is the case that the fractional part was all 1s (ones). In this case, the resulting overflow causes the result to be a 1 (one) in the overflow bit, with all of the other bits being a 0 (zero). In fact, the overflow bit is actually the "hidden 1" of the resulting floating-point number, and the actual fractional part is the value 0 (zero). Therefore, it is not necessary to perform the right shift. That is, only the updating of the exponent is necessary. Bits 62:40 are used for the final single-precision floating-point number.

Note that the advantage of aligning the floating-point operation result to bit position 63 is that the handling for the overflow case and the leading zero case have been combined, so that no right shift if necessary. In fact, there is not even a need to check for the overflow condition into bit position 24. If an overflow occurs, the left shift amount of the data would be 39 bit positions, whereas if no overflow occurs and there are no leading zeros, the left shift amount would be 40 bit positions. If there were leading zeros in the result, the left shift amount would be greater than 40 bit positions. In each case, the exponent is correctly updated. A final adjustment to the exponent is made at the end of the operation by adding the constant value 40. This value corresponds to the difference between the left most 1 (one) at bit position 63 instead of at bit position 23.

Double-Precision Arithmetic Operations

Figure 1D:
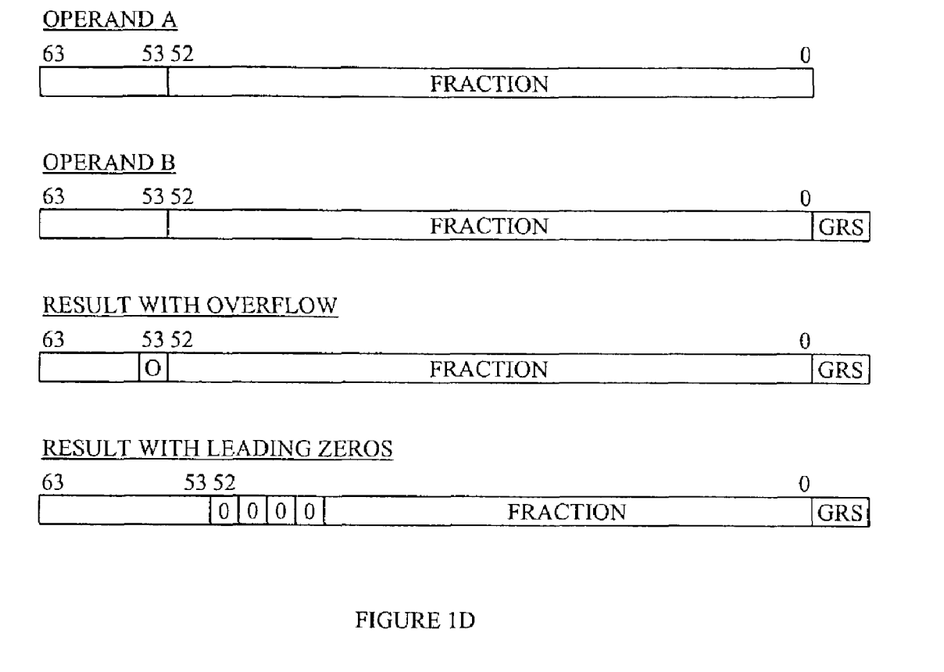

Double-precision floating-point numbers have 53 bits of precision, once the "hidden 1" is included in the number. For double-precision arithmetic operations, the operands and result within the 64-bit datapath are shown in FIG. 1D.

Figure 1E:
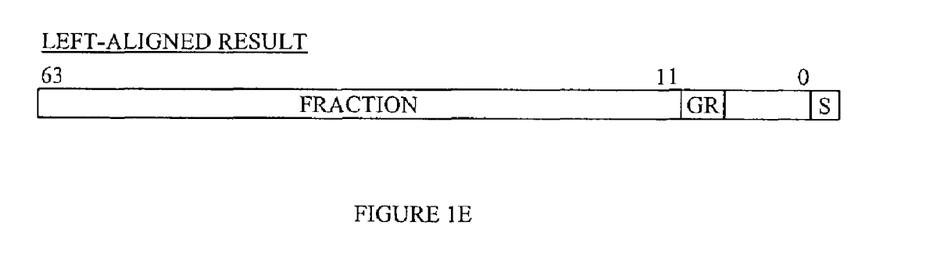

In the "Result with overflow," the "O" bit represents an overflow from the math operation, such as may occur with addition. In the "Result with leading zeros," the fractional part includes several leading zeros resulting from the math operation, such as may occur with subtraction, where the most significant bits are canceled out. In both cases, instead of shifting the data right for overflow, or shifting the data left for leading zeros, the leftmost 1 (one) of the result is determined and the result is shifted so that the leftmost 1 (one) is at bit position 63. The exponent part is updated accordingly. The resulting data is shown in FIG. 1E.

Figure 1F:
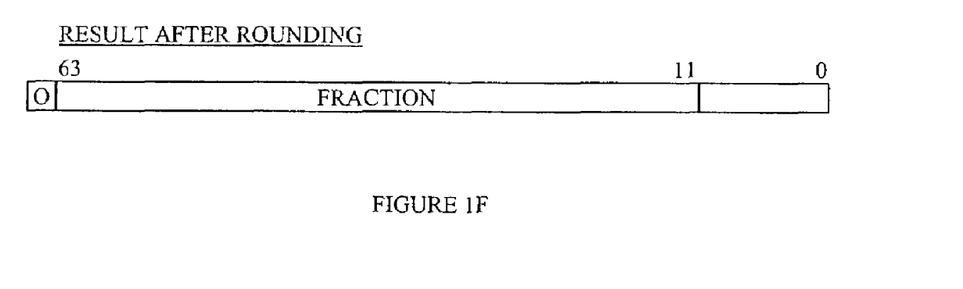

Note that the sticky bit, which represents any number of bits that are shifted right beyond the round bit, does not shift. The result is now ready to be rounded based on the guard, round and sticky bits, as well as the rounding mode configuration setting. The result after rounding is shown in FIG. 1F.

The guard, round and sticky bits are no longer necessary. Once again, it is possible that an overflow occurred, but in this case the overflow bit is actually the "hidden 1" of the floating-point number, and the factional part is 0 (zero). The exponent simply needs to be updated for the overflow, and the fractional part does not need to be shifted. Bits 61:11 are used for the final double-precision floating-point number.

Note that as with the single-precision case above, the handling for the overflow case and the leading zero case have been combined, so that no right shift is necessary. In fact, there is no need to check for the overflow condition into bit position 53. That is, if an overflow occurred the left shift amount would be 10 bit positions, whereas if there were no overflow and no leading zeros, the left shift amount would be 11 bit positions. If there were leading zeros in the floating-point operation result, the left shift amount would be greater than 11 bit positions. In each case, the exponent is correctly updated. A final adjustment to the exponent is made at the end of the operation by adding the constant value 11. This value corresponds to the difference between the leftmost 1 (one) at bit position 63 instead of at bit position 52.

Floating-Point Conversion Operations

For conversions between two floating-point formats, no special logic is needed. That is, instead of shifting the data left or right by 29 bit positions, the data is always left-aligned using the same logic as that used in the arithmetic operations.

Single-Precision to Double-Precision Conversion

Figure 1G:
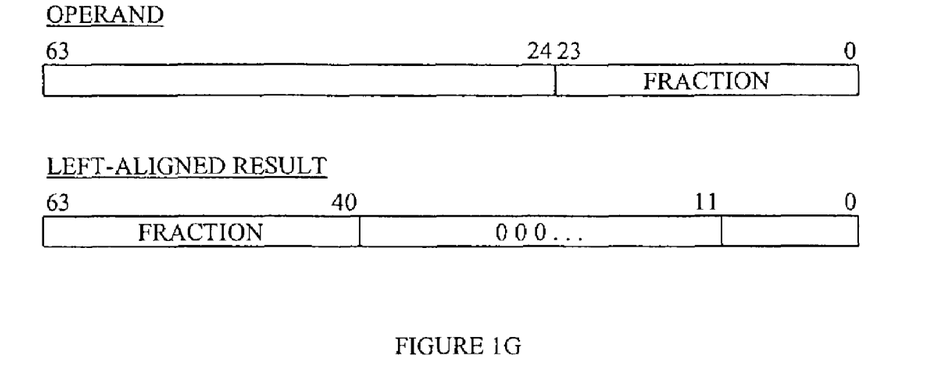

The single-precision to double-precision conversion starts with the 24-bit fractional part from the single-precision floating-point number. The operand and left-aligned result are shown in FIG. 1G.

In the process of being left-aligned, the exponent is adjusted for the left shift. This is the same as with the arithmetic operation above. In this case, the exponent will be adjusted by the constant value 40 because the data is being shifted left 40 bit positions. Once the data is left-aligned, no further processing of the data is necessary. As with the arithmetic operation above, bits 62:11 are used for the final double-precision floating-point number (bits 39:11 are zeros), and the exponent is adjusted by the constant value 11 to account for the difference between the leftmost 1 (one) being at bit position 63 instead of at bit position 52.

Double-Precision to Single-Precision Conversion

Figure 1H:
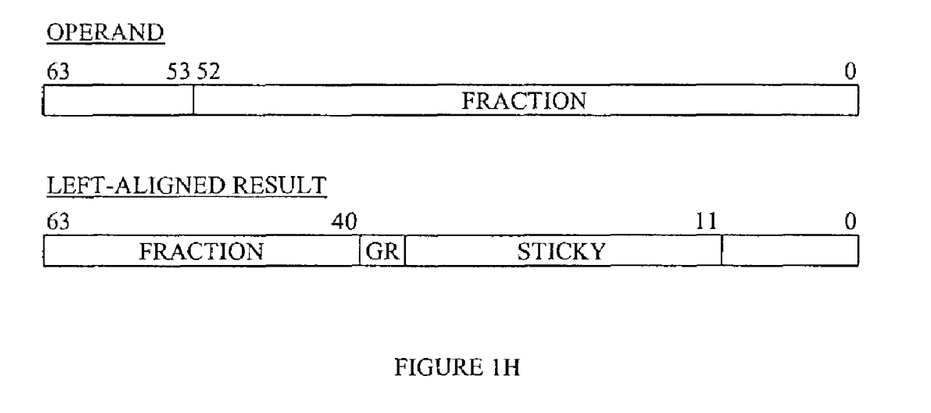

The double-precision to single-precision conversion starts with the 53-bit fractional part from the double-precision floating-point number. The operand and left-aligned result are shown in FIG. 1H.

Figure 1I:
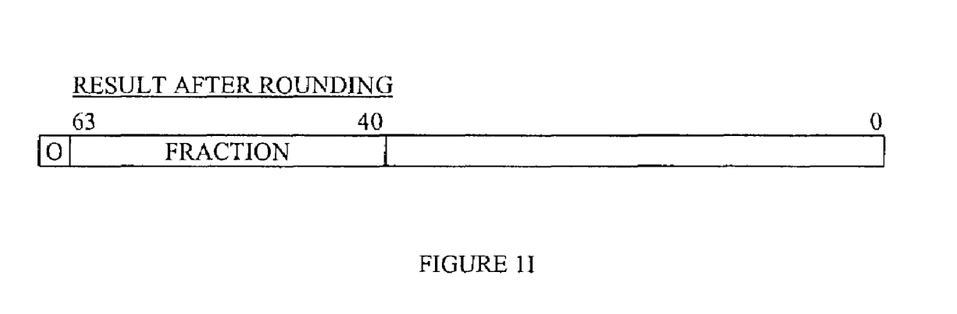

In the process of being left-aligned, the exponent is adjusted for the left shift. This is the same as with the arithmetic operation above. In this case, the exponent will be adjusted by the constant value 11 because the data is being shifted 11 bit positions. Because the double-precision fractional part has more significant bits than the single-precision fractional part, rounding may be necessary. In this case, bits 39:38 are the guard and round bits, and the sticky bit is the result of the OR logic operation of bits 37:11. Since 0s (zeros) are shifted into the data, it is possible to perform the OR logic operation on all of the bits 37:0. This will simplify the sticky bit generation, because the same function is performed in the long-to-single-precision conversion that is described below. The result after rounding is shown in FIG. 1I.

The guard, round and sticky bits are no longer necessary. Once again, it is possible that an overflow occurred, but in this case the overflow bit is actually the "hidden 1" of the floating-point number, and the fractional part is 0 (zero). Only the exponent needs to be updated for the overflow, and the fractional part does not need to be shifted. Bits 62:40 are used for the final single-precision floating-point number. A final adjustment to the exponent is made at the end of the operation by adding the constant value 40. This value corresponds to the difference between the leftmost 1 (one) at bit position 63 instead of at bit position 23, as with the single-precision arithmetic operations above.

Fixed-to-Floating Conversion Operations

There are four fixed-to-floating conversion operations. In each of the four operations, the data is again left-aligned to bit position 63, which eliminates the need to shift the data to the right. In the examples below, the fixed-point data is shown to be positive. However, if the fixed-point data is negative, it needs to be inverted and the sign bit needs to be changed because the fractional part of floating-point numbers is always positive.

Word-to-Single Conversion

Figure 1J:
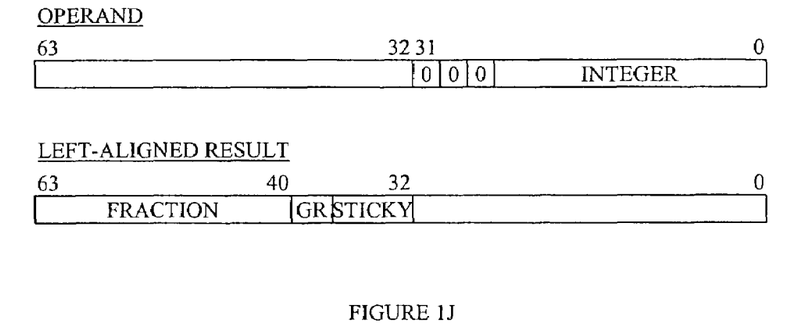

In the word-to-single-precision conversion, the exponent is initialized to the value 23. This corresponds to the difference between the decimal point being to the right of bit position 0 (zero) for the word format, and the decimal being to the right of bit position 23 for the single-precision format. The word data will always have one or more leading zeros. The operand and the left-aligned result are shown in FIG. 1J.

Figure 1K:
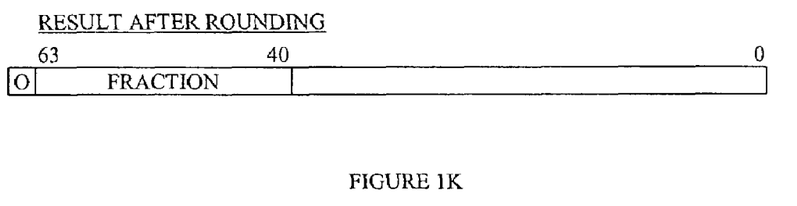

In the process of being left-aligned, the exponent is adjusted for the left shift. This is the same as in the arithmetic operation above. Since the word data has more significant bits than the single-precision fraction, rounding may be necessary. In this case, bits 39:38 are the guard and round bits and the sticky bit is the result of the OR logic operation of bits 37:32. Since 0s (zeros) are shifted into the data, it is possible to perform the OR logic operation on all of the bits 37:0. This will simplify the sticky bit generation, because the same function is done in the long-to-single-precision conversion that is described later. The result after rounding is shown in FIG. 1K.

The guard, round and sticky bits are no longer necessary. Once again, it is possible that an overflow occurred, but in this case the overflow bit is actually the "hidden 1" of the floating-point number, and the fractional part is 0 (zero). Only the exponent needs to be updated for the overflow, and the fractional part does not need to be shifted. Bits 62:40 are used for the final single-precision floating-point number. A final adjustment to the exponent is made at the end of the operation by adding the constant value 40. This value corresponds to the difference between the left most 1 (one) at bit position 63 instead of at bit position 23, which is the same procedure as with the single-precision arithmetic operations above.

Long-to-Single Conversions

Figure 1L:
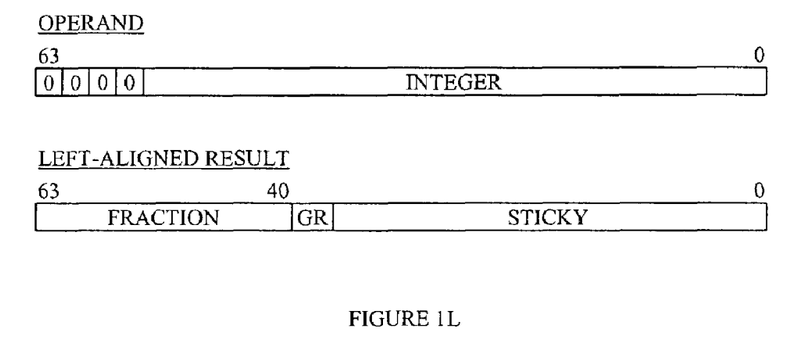

In the long to single-precision conversion, the exponent is initialized to the value 23. This value corresponds to the difference between the decimal point being to the right of bit position 0 (zero) for the long format, and the decimal point being to the right of bit position 23 for the single-precision format. The long data will always have one or more leading zeros. The operand and left-aligned result are shown in FIG. 1L.

Figure 1M:
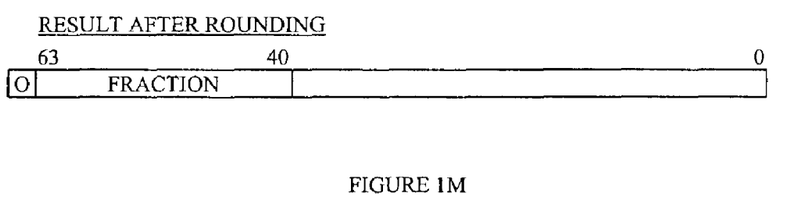

In the process of being left-aligned, the exponent is adjusted for the left shift. This is the same as with the arithmetic operation. Since the long data has more significant bits than the single-precision fractional part, rounding may be necessary. In this case, bits 39:38 are the guard and round bits, and the sticky bit is the result of the OR logic operation of bits 37:0. The result after rounding is shown in FIG. 1M.

The guard, round and sticky bits are no longer necessary. Once again, it is possible that an overflow occurred, but in this case the overflow bit is actually the "hidden 1" of the floating-point number, and the fractional part is 0 (zero). Only the exponent needs to be updated for the overflow, and the fractional part does not need to be shifted. Bits 62:40 are used for the final single-precision floating-point number. A final adjustment to the exponent is made at the end of the operation by adding the constant value 40. This value corresponds to the difference between the leftmost 1 (one) at bit position 63 instead of at bit position 23, as with the single-precision arithmetic operations above.

Word-to-Double-Precision Conversions

Figure 1N:
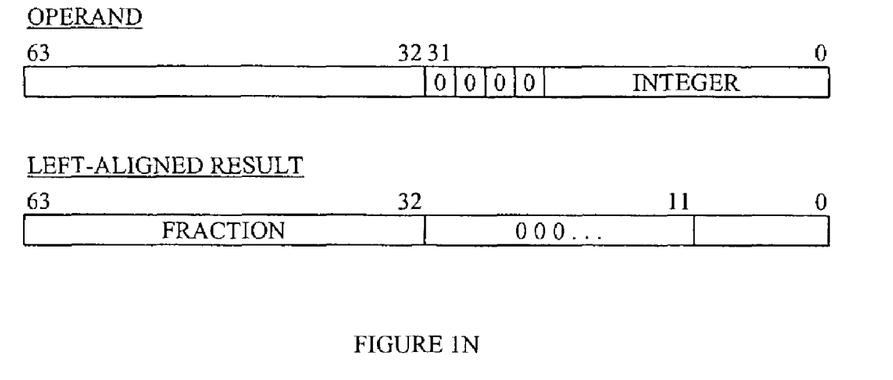

In the word-to-double-precision conversion, the exponent is initialized to the value 52. This corresponds to the difference between the decimal point being to the right of bit position 0 (zero) for the word format, and the decimal point being to the right of bit position 52 for the double-precision format. The word data will always have one or more leading zeros. The operand and the left-aligned result is shown in FIG. 1N.

In the process of being left-aligned, the exponent is adjusted for the left shift. This is the same as with the arithmetic operation above. Since the word data has fewer significant bits than the double-precision fractional part, once the data is left-aligned, no further processing of the data is necessary. As with the arithmetic operation case, bits 62:11 are used for the final double-precision floating-point number (bits 31:11 are zeros), and the exponent is adjusted by the constant value 11 to account for the difference between the leftmost 1 (one) being at bit position 63 instead of at bit position 52.

Long-to-Double-Precision Conversions

Figure 1P:
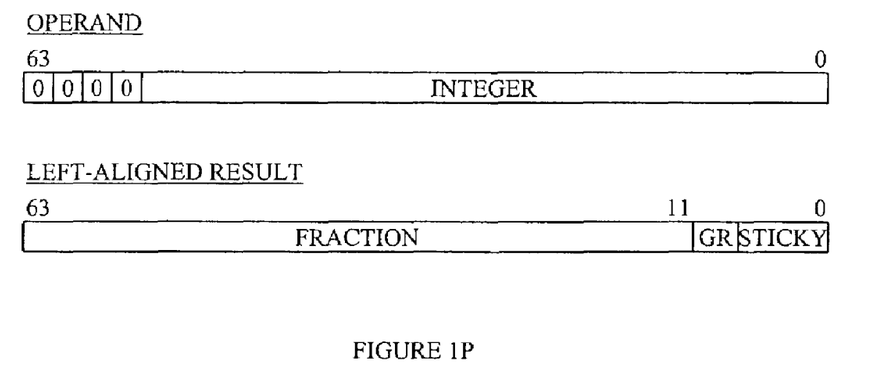

In the long-to-double-precision conversion, the exponent is initialized to the value 52. This value corresponds to the difference between the decimal point being to the right of bit position 0 (zero) for the long format, and the decimal point being to the right of bit position 52 for the double-precision format. The long-format data will always have one or more leading 0s (zeros). The operand and left-aligned result are shown in FIG. 1P.

Figure 1Q:
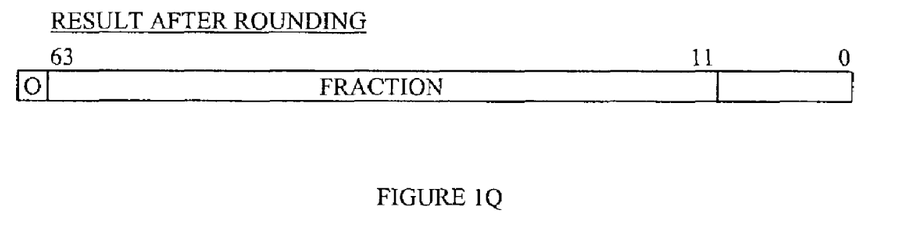

In the process of being left-aligned, the exponent is adjusted for the left shift. This is the same as with the arithmetic operation above. Since the long-format data has more significant bits than the double-precision fractional part, rounding may be necessary. In this case, bits 10:9 are the guard and round bits, and the sticky bit is the result of the OR logic operation of bits 8:0. The result after rounding is shown in FIG. 1Q.

The guard, round and sticky bits are no longer necessary. Once again, it is possible that an overflow occurred, but in this case the overflow bit is actually the "hidden 1" of the floating-point number, and the fractional part is 0 (zero). Only the exponent needs to be updated for the overflow, and the fractional part does not need to be shifted. Bits 62:11 are used for the final double-precision floating-point number. A final adjustment to the exponent is made at the end of the operation by adding the constant value 11. This value corresponds to the difference between the leftmost 1 (one) at bit position 63 instead of at bit position 52 (the same as with the double-precision arithmetic operations above).

Floating-to-Fixed Conversion Operations

The floating-point to fixed-point conversion operations are the only ones in which the data is not left-aligned to bit position 63 in the datapath. Instead, the alignment of the data is based on the exponent of the operand.

Single-Precision-to-Word and
Single-Precision-to-Long Conversions

The exponent is compared to the constant value 23. If the exponent is less than 23, the data must be shifted right. For this function, the same shift circuitry that is used to align operands for addition and subtraction is used. In this way, no additional right shift circuitry is needed. If the exponent is greater than 23, then the data must be shifted left. The same shift circuitry that normally left-aligns the fractional part can be used for this purpose, where the amount of the shift is equal to the value of the exponent minus the value 23. When the exponent is exactly 23, no shifting is necessary. If an operand needs to be shifted right, it may be necessary to round the fixed-point data.

Double-Precision-to-Word and
Double-Precision-to-Long Conversions

The exponent is compared to the constant value 52. If the exponent is less than the value 52, the data must be shifted right. For this function, the same shift circuitry that is used to align operands for addition and subtraction is used. In this way, no additional right shift circuitry is needed. If the exponent is greater than 52, then the data must be shifted left. The same shift circuitry that normally left-aligns the fractional part can be used for this purpose, where the amount of the shift is equal to the value of the exponent minus the value 52. When the exponent is exactly 52, no shifting is necessary. If an operand needs to be shifted right, it may be necessary to round the fixed-point data.

Thus concludes a detailed discussion of the theory underlying the core concepts of the present invention. The remainder of this specification will address exemplary embodiments of rudimentary circuits by which the simplified normalizing and rounding of the present invention may be implemented, a method for performing such normalizing and rounding, and a processor incorporating such a method or circuits.

Figure 2:
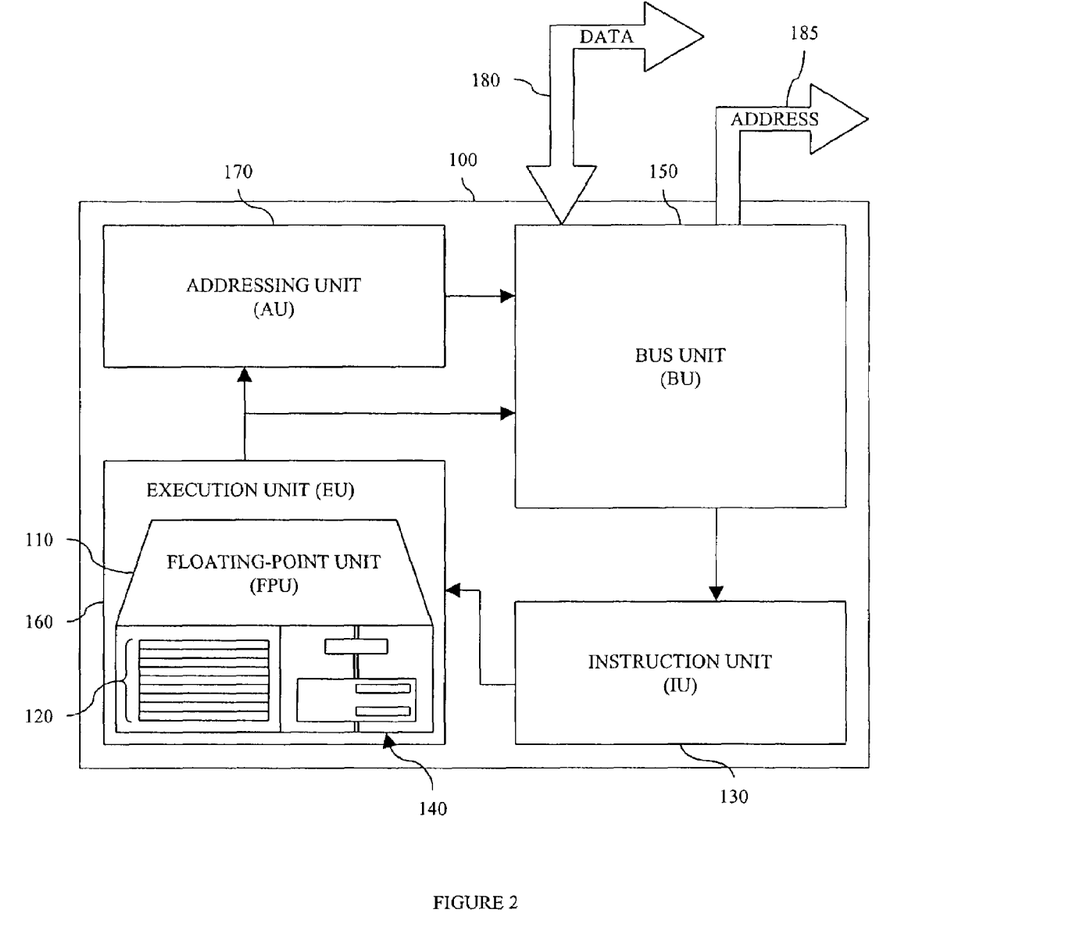
FIG. 2 illustrates a block diagram of one embodiment of a processor having a floating-point unit that forms an environment within which may be incorporated a circuit constructed, or a method carried out, according to the principles of the present invention.

Referring now to FIG. 2, illustrated is a block diagram of one embodiment of a processor 100 having a floating-point unit (FPU) 110 that forms an environment within which may be incorporated a circuit constructed, or a method carried out, according to the principles of the present invention. The processor 100 also includes registers 120, an instruction unit (IU) 130, and a circuit 140. Of course, those skilled in the art will understand that the processor 100 may include additional elements within the scope of the present invention. For example, as in the embodiment shown in FIG. 2, the processor 100 may also include a bus unit (BU) 150, an execution unit (EU) 160, and an addressing unit (AU) 170.

The registers 120 hold data to be processed in the processor 100. The registers 120 may hold word-precision or long-precision fixed-point data, single-precision or double-precision floating-point data, or any combination thereof. Moreover, data held in the registers 120 may be in big endian or little endian form, and may include a fractional part having a width of 23 or 52 bits. That is, the present invention is not restricted to processing data having a particular bit order or fractional part width.

The IU 130 receives instructions regarding data processing to occur in the processor 100. As shown in FIG. 2, the IU 130 may receive instructions from the BU 150. The instructions received by the IU 130 may be those pertaining to arithmetic or conversion operations, and may be decoded for immediate transfer to the FPU 110, the circuit 140, and/or the EU 160. However, in one embodiment, the IU 130 itself may decode the instructions received from the BU 150. Those skilled in the art understand how instructions may be decoded prior to their execution.

The FPU 110 is coupled to the registers 120 and the IU 130, directly or indirectly. For instance, as shown in FIG. 2, the FPU 110 may be directly coupled to the registers 120, and may be indirectly coupled to the IU 130. The FPU 110 executes floating-point instructions with respect to data held in the registers 120, yielding floating-point results typically requiring normalizing and rounding.

The BU 150 may establish connection to surrounding circuitry, including circuitry external to the processor 100 (not shown). For instance, as shown in FIG. 2, the BU 150 may permit data flow to and from the processor 100 via a data bus, indicated by the arrow 180. With the data bus 180, the processor 100 may write or read data to or from memory (not shown). To facilitate such data access, the processor 100 may calculate a memory location or address in the AU 170. The BU 150 may pass address information from the processor 100 via an address bus, indicated by the arrow 185. The BU 150 may fetch instructions from surrounding circuitry, such as memory circuitry (not shown), and transfer them to the IU 130.

As shown in FIG. 2, the EU 160 may house the FPU 110, the registers 120, and the circuit 140. Accordingly, the EU 160 may be responsible for data processing within the processor 100, including data processing not executed by the FPU 110, and may contain other elements (not shown) for performance thereof.

Figure 3:
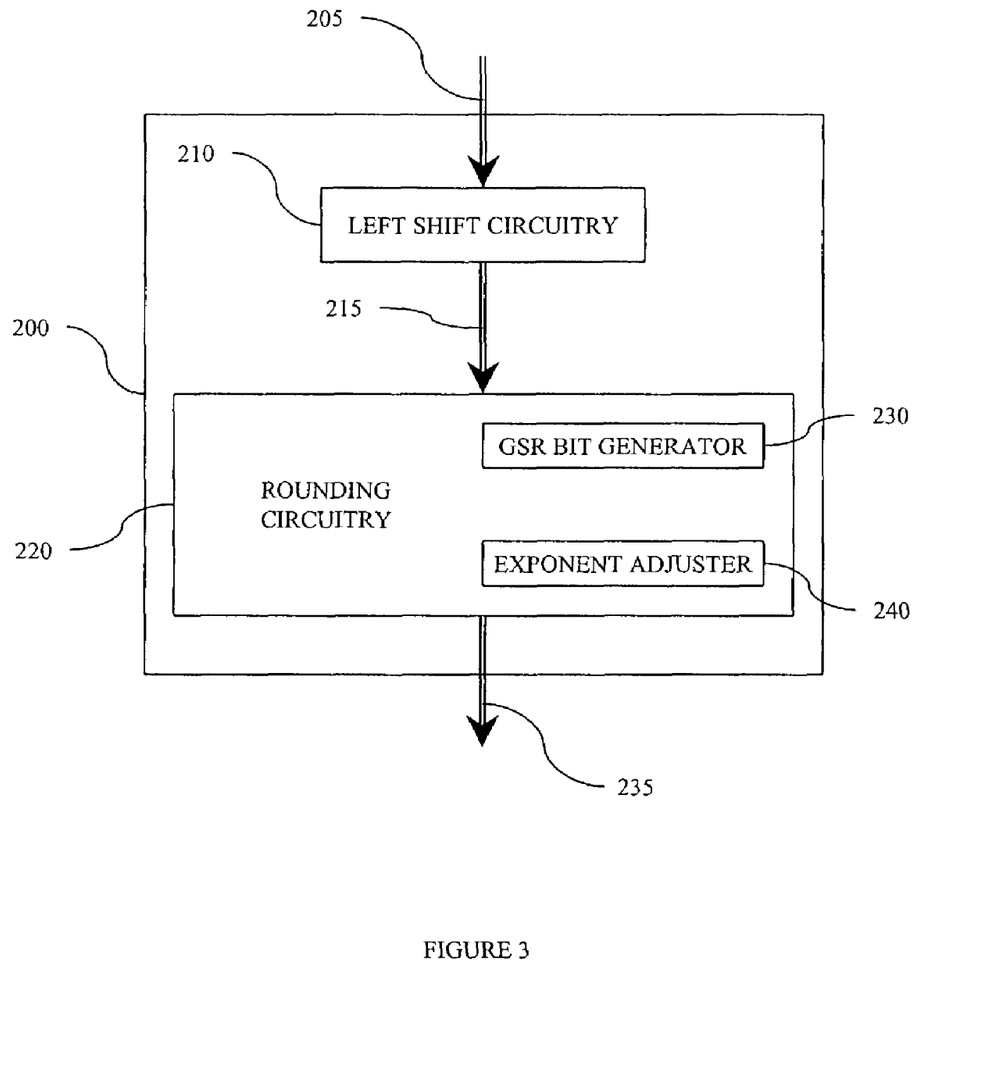
FIG. 3 illustrates a block diagram of one embodiment of a circuit for normalizing and rounding a floating-point result constructed according to the principles of the present invention.

Turning now to FIG. 3, illustrated is a block diagram of one embodiment of a circuit 200 for normalizing and rounding floating-point results. The circuit 200 may be incorporated into an FPU or another portion of a processor or computer. For instance, the circuit 200 may be implemented in the processor 100 shown in FIG. 2. The circuit 200 may be used in an FPU that supports floating-point data formats having fractional parts of varying widths, such as 23 bits or 52 bits. Such an FPU may also employ a datapath wider than the fractional parts. In one embodiment, the datapath width may be 64 bits. Such floating-point data is received by the circuit 200 from external circuitry, as indicated by the arrow 205. For instance, the circuit 200 may receive the floating-point data from the FPU 110 shown in FIG. 2.

As shown in FIG. 3, the circuit 200 includes left-shift or left-align circuitry 210 and rounding circuitry 220. The left-shift circuitry 210 is indicated in FIG. 3 in block schematic form, because the left-shift circuitry 210 may be conventional left-shift circuitry. Those skilled in the art are familiar with left-shift circuitry. In general, the logic underlying such a left-shift of the floating-point result is described in the scenarios above.

The left-shift circuitry 210 aligns a fractional part of the floating-point result received from external circuitry with a most significant bit of the datapath irrespective of a width of the fractional part, thereby yielding a shifted fractional part. For instance, a most significant 1 (one) in the fractional part may be aligned with the most significant bit of the datapath.

The rounding circuitry 220 is coupled to the left-shift circuitry 210, such as by interconnecting traces, wire bond or other means, in order to receive at least the shifted fractional part of the floating-point result from the left-shift circuitry 210. Such data transfer is indicated in FIG. 3 by the arrow 215. The rounding circuitry 220 operates to round the shifted fractional part of the floating-point result. The rounding circuitry 220 is also indicated in FIG. 3 in block schematic form because the rounding circuitry 220 may also be conventional rounding circuitry. However, the rounding circuitry 220 may be at least similar to or incorporate the rounding circuitry disclosed Provisional U.S. Patent Application Ser. No. 60/397,589, filed on Jul. 19, 2002, and assigned to the assignee of the present invention. In general, the logic underlying the rounding performed by the rounding circuitry 220 according to the principles of the present invention is described in the scenarios above. The normalized and rounded floating-point result may then be passed from the circuit 200, as indicated by the arrow 235.

In one embodiment, the rounding circuitry 220 may also generate guard, round and sticky (GSR) bits for the shifted fractional part, as described in the scenarios above. Thus, as shown in FIG. 3, the rounding circuitry 220 may include a GSR bit generator 230. Alternatively, or in cooperation with the GSR bit generator 230, the rounding circuitry 220 may receive GSR bits from circuitry external to the rounding circuitry 220 or the circuit 200. The GSR bits may be employed by the rounding circuitry 220 to execute the rounding operation, such as in the scenarios described above. Moreover, the GSR bits may be manipulated during the left-shift operation executed by the left-shift circuitry 210, as in the scenarios described above.

As also described above, the rounding circuitry 220, or another element of the circuit 200, may operate to adjust the exponent of the floating-point result in cooperation with the left-shift and rounding operations. To execute such adjustment, as shown in FIG. 3, the rounding circuitry 200 may include an exponent adjuster 240. For instance, as described in the scenarios above, the exponent adjustment may be performed based on the number of bits that the data is shifted left during the left-shift operation, and for an overflow from the rounding executed by the rounding circuitry 220.

Figure 4:
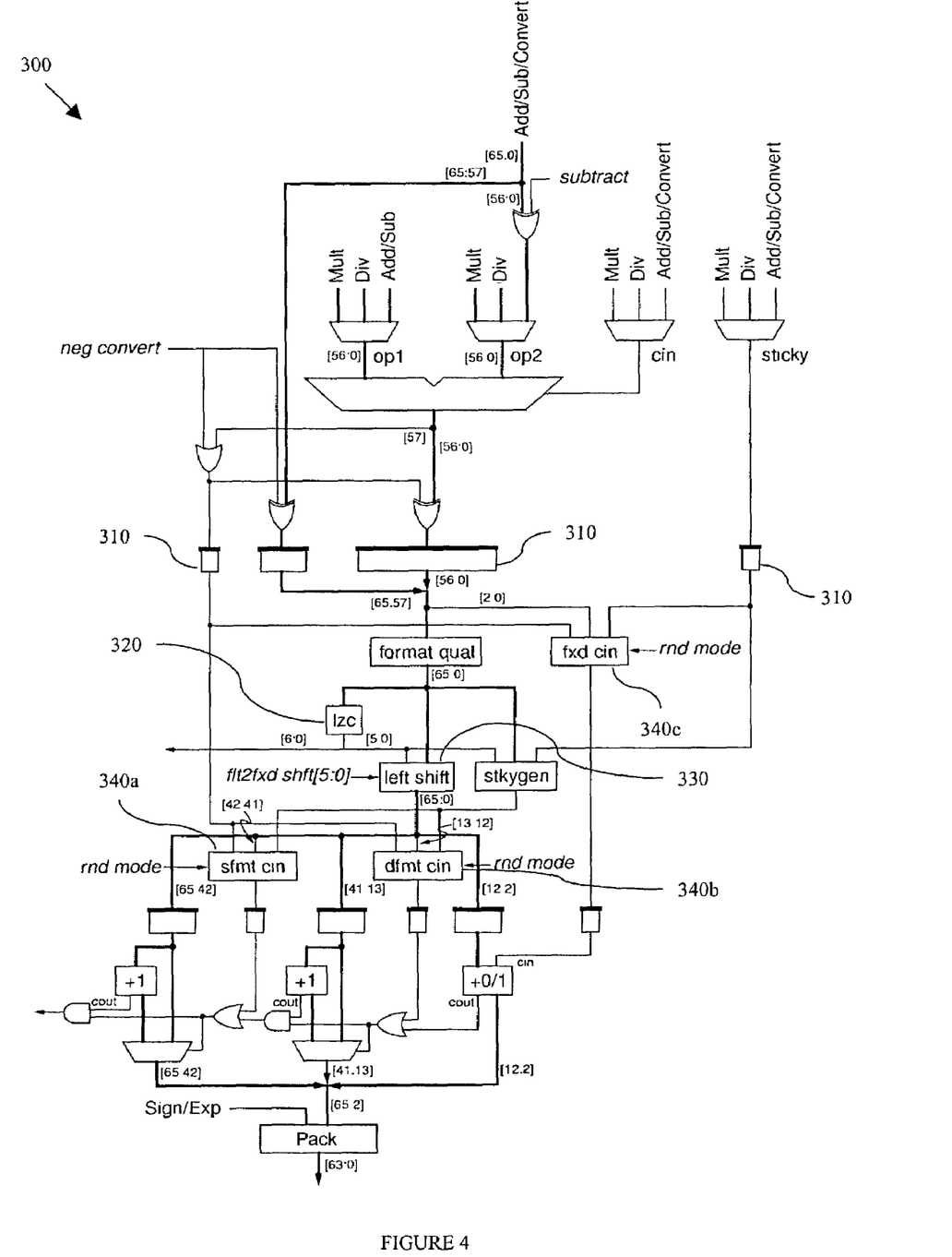
FIG. 4 illustrates a block diagram of another embodiment of a circuit for normalizing and rounding a floating-point result constructed according to the principles of the present invention.

Turning now to FIG. 4, illustrated is a circuit 300 which is a specific embodiment of the circuit 200 shown in FIG. 3. The circuit 300 is intended only as an exemplary embodiment of the circuit 200 shown in FIG. 3. That is, those skilled in the art will understand that myriad variations may be made to the circuit 300 within the concept of the present invention. To that extent, only a cursory description of the circuit 300 will be provided herein.

As shown in FIG. 4, floating-point results, or portions thereof, may be temporarily stored or buffered in registers 310. The number of leading 0s (zeros) may be counted or otherwise determined by the leading zero count block 320 (lzc block). The lzc block 320 may calculate the number of leading 0s (zeros) in the floating-point result, or fractional part thereof, starting with bit position 63. As discussed in the scenarios above, the number of leading 0s (zeros) may be used to determine the bit position for the leftmost or most significant 1 (one). This value may be used to adjust the exponent of the result. The lzc block 320 may include conventional circuitry, as known to those skilled in the art.

The left-shift circuitry 210 shown in FIG. 3 may be embodied in the left-shift block 330 shown in FIG. 4. As discussed in the scenarios above, the left-shift block 330 may perform the left-shift or left-align of the floating-point data to align the data correctly. For most of the scenarios described above, the left-shift block 330 will use the 0 (zero) count from the lzc block 320 as a shift control in order to align the leftmost 1 (one) to bit position 63. The exception is for floating-point to fixed-point conversions, as discussed above. In this case, the shift control is determined by the exponent value and the operand format.

The rounding circuitry 220 shown in FIG. 3 may be embodied in the rounding calculators 340 shown in FIG. 4. In the circuit 300 shown in FIG. 4, the rounding calculators 340 include the single-precision format rounding calculator 340a (sfmt cin block), the double-precision format rounding calculator 340b (dfmt cin block), and the fixed-point rounding calculator 340c (fxd cin block). The rounding calculators 340 calculate whether to round the left-shifted data up or down based on the least significant bit of the data, and may also use the GSR bits (discussed below).

The GSR bit generator 230 shown in FIG. 3 may be embodied in the sticky bit generator block 350 (stkygen block) shown in FIG. 4. The stkygen block 350 may perform the OR logic operation of low order bits of the floating-point data to determine the sticky bit to be used in the rounding calculators 340, as described in the scenarios discussed above.

Figure 5:
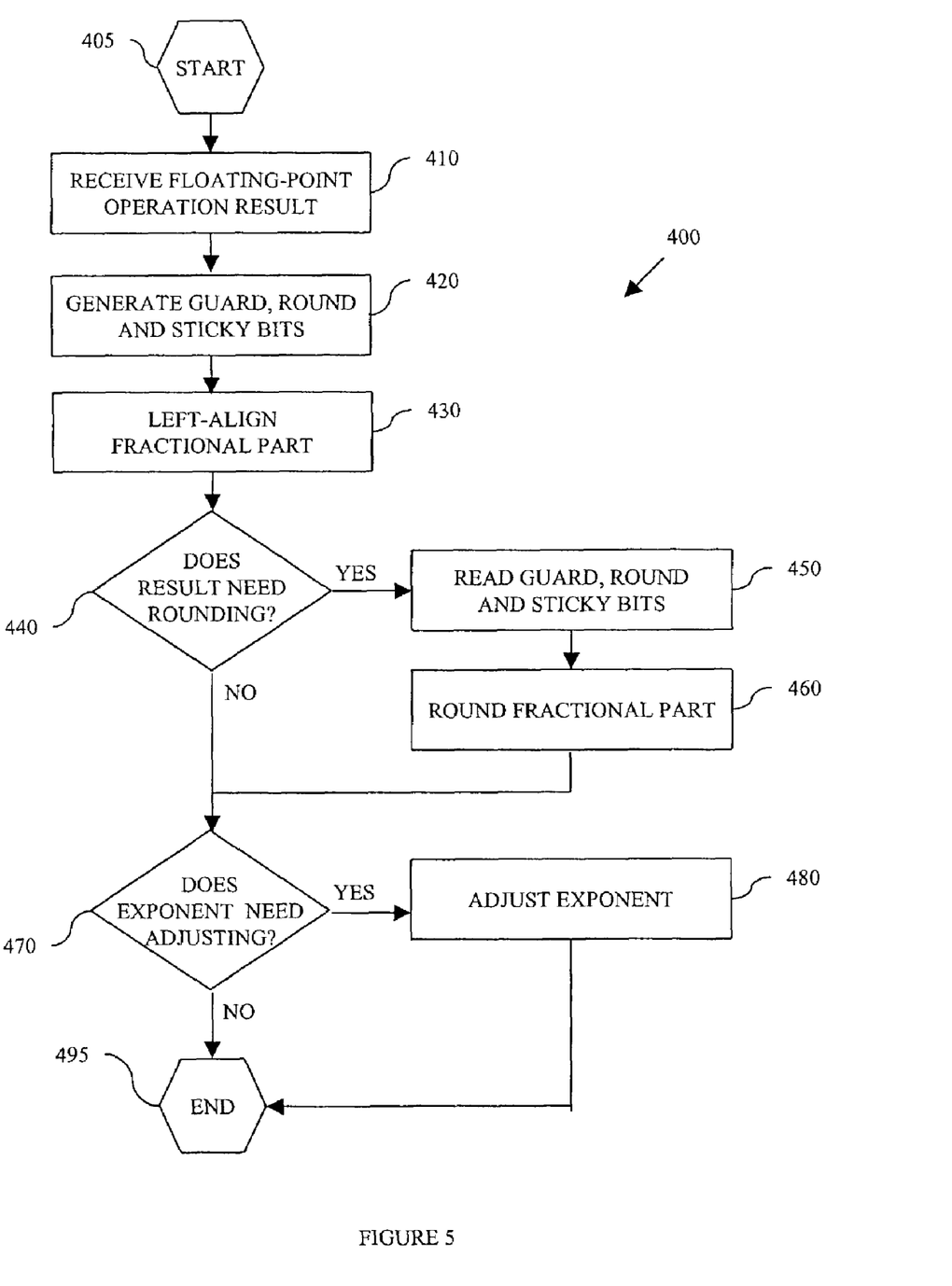
FIG. 5 illustrates a flow diagram of one embodiment of a method of normalizing and rounding a floating-point result according to the principles of the present invention.

Turning now to FIG. 5, illustrated is a flow diagram of one embodiment of a method 400 of normalizing and rounding a floating-point result according to the principles of the present invention. The method 400 may be performed by a circuit such as the circuits 200 and 300 shown in FIGS. 2 and 3, respectively, and/or by a processor such as the processor 100 shown in FIG. 2.

After the method 400 initiates at a start step 405, a floating-point result of a floating-point operation is received at a step 410. The floating-point result may be in big endian or little endian form, may include a fractional part having a width of 23 or 52 bits, and may be transferred by a datapath having a width of 64 bits. That is, the method 400 and other methods of the present invention are not restricted to processing data having a particular bit order, fractional part width or datapath width.

GSR bits are then generated or received in a step 420. The floating-point result, or the fractional part thereof, is then left-shifted or aligned in a step 430, as described in the scenarios above.

A decisional step 440 then determines whether or not the left-shifted data requires rounding. If rounding is required, GSR bits may be read in a step 450, and the fractional part of the floating-point result is rounded in a step 460.

A decisional step 470 then determines whether or not the exponent of the left-shifted data requires adjusting. If adjusting is required, the exponent is adjusted as described in the scenarios above in a step 480. The method 400 then ends in a termination step 495.

The present invention thus presents the concept of a simplified method of normalizing and rounding the result of floating-point operations, as well as a circuit and processor by which the method may be implemented. The simplified method has the advantages of reduced complexity, smaller size and faster data manipulation. The smaller size results from requiring fewer components required to execute the operation. The faster data manipulation results from fewer logic levels required therefor.

For instance, because the floating-point data is always left-aligned or shifted, both overflow and non-overflow cases and handled in the same manner. Accordingly, it is not necessary to check for overflow, and the exponent needs no special handling for the overflow case.

With the present invention, there is also no need for special aligning or shifting based on single-precision or double-precision results. For results with leading 0s (zeros), instead of left-shifting single-precision data to bit position 23, and left-shifting double-precision data to bit position 52, both data formats are aligned to bit position 63, thereby reducing the complexity and logic levels for the shifting operation.

Moreover, single-precision to double-precision conversions and double-precision to single-precision conversions happen automatically according to the present invention. Instead of having special logic for shifting floating-point conversions, such as shifting left or right by 29 bit positions, the conversions and any associated rounding happen automatically.

The present invention also requires no special aligning for fixed-point-to-floating-point conversions. That is, the same hardware that performs the left-shifting or aligning and rounding for arithmetic operations can be used for fixed-point to floating-point conversions. The only additional logic necessary is to initialize the exponent before shifting occurs.

The present invention also eliminates the right shifting associated with rounding overflows. Because the fractional part is 0 (zero) when an overflow occurs, and the overflow bit becomes the "hidden 1" of the floating-point format, the data doesn't need to shifted right. Only the exponent needs adjustment, such as an increment by the value 1 (one).

Although the present invention has been described in detail, those skilled in the art should understand that they can make various changes, substitutions and alterations herein without departing from the spirit and scope of the invention in its broadest form.

What is claimed is:

1. For use in a floating-point unit that supports floating-point formats having fractional parts of varying widths and employs a datapath wider than said fractional parts, a circuit for normalizing and rounding a floating-point result, comprising:
    left-shift circuitry for aligning a fractional part of said floating-point result with a most significant bit of said datapath and irrespective of a width of said fractional part to yield a shifted fractional part; and
    rounding circuitry, coupled to said left-shift circuitry, for rounding said shifted fractional part.

2. The circuit as recited in claim 1 wherein a most significant one in said fractional part is aligned with said most significant bit.

3. The circuit as recited in claim 1 wherein said varying widths are selected from the group consisting of:
    23 bits, and
    52 bits.

4. The circuit as recited in claim 1 wherein said width of said datapath is 64 bits.

5. The circuit as recited in claim 1 wherein said rounding circuitry further generates guard, round and sticky bits for said shifted fractional part.

6. The circuit as recited in claim 5 wherein said left-shift circuitry shifts said guard and round bits with said fractional part.

7. The circuit as recited in claim 1 wherein said rounding circuitry further adjusts an exponent part of said floating-point result based upon an overflow from said rounding.

8. For use in a floating-point unit that supports floating-point formats having fractional parts of varying widths and employs a datapath wider than said fractional parts, a method of normalizing and rounding a floating-point result, comprising:
    aligning a fractional part of said floating-point result with a most significant bit of said datapath and irrespective of a width of said fractional part to yield a shifted fractional part; and
    rounding said shifted fractional part.

9. The method as recited in claim 8 wherein said aligning comprises aligning a most significant one in said fractional part with said most significant bit.

10. The method as recited in claim 8 wherein said varying widths are selected from the group consisting of:
    23 bits, and
    52 bits.

11. The method as recited in claim 8 wherein said width of said datapath is 64 bits.

12. The method as recited in claim 8 further comprising generating guard, round and sticky bits for said shifted fractional part.

13. The method as recited in claim 12 further comprising shifting said guard and round bits with said fractional part.

14. The method as recited in claim 8 further comprising adjusting an exponent part of said floating-point result based upon an overflow from said rounding.

15. A processor, comprising:
    registers for holding data to be processed in said processor;
    an instruction unit for receiving instructions regarding data processing to occur in said processor;
    a floating-point unit, coupled to said registers and said instruction unit, that supports floating-point formats having fractional parts of varying widths, employs a datapath wider than said fractional parts, executes floating-point instructions with respect to data held in said registers and has a circuit for normalizing and rounding a floating-point result, including:
        left-shift circuitry for aligning a fractional part of said floating-point result with a most significant bit of said datapath and irrespective of a width of said fractional part to yield a shifted fractional part, and
        rounding circuitry, coupled to said shift circuitry, that rounds said shifted fractional part.

16. The processor as recited in claim 15 wherein a most significant one in said fractional part is aligned with said most significant bit.

17. The processor as recited in claim 15 wherein said varying widths are selected from the group consisting of:
    23 bits, and
    52 bits.

18. The processor as recited in claim 15 wherein said width of said datapath is 64 bits.

19. The processor as recited in claim 15 wherein said rounding circuitry further generates guard, round and sticky bits for said shifted fractional part.

20. The processor as recited in claim 19 wherein said left-shift circuitry shifts said guard and round bits with said fractional part.

* * * * *